US012802984B2

(12) United States Patent
Zhong et al.

(10) Patent No.: US 12,802,984 B2
(45) Date of Patent: Nov. 17, 2026

(54) POSITIVE ELECTRODE ACTIVE MATERIAL, METHOD FOR PREPARING POSITIVE ELECTRODE MATERIAL, POSITIVE ELECTRODE PLATE, SECONDARY BATTERY, BATTERY MODULE, BATTERY PACK AND ELECTRICAL APPARATUS

(71) Applicant: CONTEMPORARY AMPEREX TECHNOLOGY (HONG KONG) LIMITED, Hong Kong (CN)

(72) Inventors: Wei Zhong, Ningde (CN); Xiaowen Zhang, Ningde (CN); Pengcheng Qin, Ningde (CN); Mingxiang Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 37 days.

(21) Appl. No.: 18/614,765

(22) Filed: Mar. 25, 2024

(65) Prior Publication Data

US 2024/0234724 A1 Jul. 11, 2024

Related U.S. Application Data

(63) Continuation of application No. PCT/CN2022/133101, filed on Nov. 21, 2022.

(30) Foreign Application Priority Data

Dec. 29, 2021 (CN) ........................ 202111646255.1

(51) Int. Cl.

*H01M 4/04* (2006.01)
*H01M 4/1397* (2010.01)
*H01M 4/36* (2006.01)
*H01M 4/58* (2010.01)
*H01M 4/02* (2006.01)

(52) U.S. Cl.

CPC ....... *H01M 4/5825* (2013.01); *H01M 4/0404* (2013.01); *H01M 4/1397* (2013.01); *H01M 4/364* (2013.01); *H01M 4/366* (2013.01); *H01M 2004/021* (2013.01); *H01M 2004/028* (2013.01)

(58) Field of Classification Search

None
See application file for complete search history.

(56) References Cited

U.S. PATENT DOCUMENTS

| | | | | |
|---|---|---|---|---|
| 6,387,568 B1 | | 5/2002 | Barker et al. | |
| 2008/0241043 A1 | * | 10/2008 | Barker | H01M 4/623 423/306 |
| 2012/0217452 A1 | * | 8/2012 | Park | C01G 53/42 180/65.245 |
| 2013/0143081 A1 | * | 6/2013 | Watanabe | H01M 50/204 429/71 |
| 2021/0234190 A1 | * | 7/2021 | Komatsubara | H01M 4/136 |
| 2022/0006076 A1 | * | 1/2022 | Kawamura | H01M 4/364 |

FOREIGN PATENT DOCUMENTS

| | | | | |
|---|---|---|---|---|
| CN | 101262058 | | * | 9/2008 |
| CN | 101262058 | A | | 9/2008 |
| CN | 102219230 | A | | 10/2011 |
| CN | 103000894 | A | | 3/2013 |
| CN | 105074967 | A | | 11/2015 |
| CN | 105668643 | A | | 6/2016 |
| CN | 108054360 | A | | 5/2018 |
| CN | 109286005 | A | | 1/2019 |
| CN | 109817927 | A | | 5/2019 |
| CN | 110048113 | A | | 7/2019 |
| CN | 111682185 | A | | 9/2020 |
| CN | 111740100 | A | | 10/2020 |
| CN | 112103489 | A | | 12/2020 |
| CN | 112825352 | A | | 5/2021 |
| CN | 113421997 | A | | 9/2021 |
| EP | 2565968 | A1 | | 3/2013 |
| JP | 2017178705 | A | | 10/2017 |
| WO | WO 01/84655 | | * | 8/2001 |
| WO | 2015005228 | A1 | | 1/2015 |

OTHER PUBLICATIONS

Machine translation.*

Extended European Search Report issued to related EP Application No. 22913903.5, dated Feb. 28, 2025, 11 pages.

Zheng et al., "Comparitive Investigation of Phosphate-Based Composite Cathode Materials for Lithium-Ion Batteries" Applied Materials & Interfaces—Research Article, Aug. 4, 2014, School of Metallurgy and Environment, Central South University, China.

International Search Report received in the corresponding International Application PCT/CN2022/133101, mailed Feb. 6, 2023.

The First Office Action received in the counterpart CN Application No. 202111646255.1, dated Jun. 13, 2025, 16 pages with English translation.

Hu, Chen et al., Methods for Improving Low-Temperature Performance of Lithium Iron Phosphate Based Li-Ion Battery, Chinese Journal of Applied Chemistry, vol. 37, Issue 4, Apr. 10, 2020, pp. 380-386.

(Continued)

*Primary Examiner* — Austin Murata
(74) *Attorney, Agent, or Firm* — K&L Gates LLP

(57) ABSTRACT

The present application provides a positive electrode active material, comprising lithium iron phosphate as a first active material and a compound of the general formula $Li_aM(XO_4)Y_b$ as a second active material, wherein M is selected from Fe, Mn, Co, Ni, Ti, V, or a combination thereof, X is selected from one of P, S, Si, As, Mo, or W, Y is selected from F, a is any value of 1 to 2, and b is any value of 0 to 1. Further provided are a method for preparing a positive electrode material comprising the positive electrode active material, as well as a positive electrode plate, a secondary battery, a battery module, a battery pack and an electrical apparatus comprising the positive electrode active material.

11 Claims, 3 Drawing Sheets

(56) References Cited

OTHER PUBLICATIONS

Quanqi Chen et al., Electrochemical Performance of LiVPO4F/C Synthesized by Different Methods, Chinese Journal of Power Source, Jan. 2012. vol. 36 No. 1, pp. 55-58.
Office Action (with English Machine Translation), mailed Jan. 27, 2026, for corresponding Chinese Patent Application Serial No. 202111646255.1.

* cited by examiner

POSITIVE ELECTRODE ACTIVE MATERIAL, METHOD FOR PREPARING POSITIVE ELECTRODE MATERIAL, POSITIVE ELECTRODE PLATE, SECONDARY BATTERY, BATTERY MODULE, BATTERY PACK AND ELECTRICAL APPARATUS

CROSS REFERENCE OF RELATED APPLICATIONS

The present application is a continuation of international application PCT/CN2022/133101, filed on Nov. 21, 2022, which claims priority to Chinese Patent Application No. 202111646255.1, entitled ""POSITIVE ELECTRODE ACTIVE MATERIAL, METHOD FOR PREPARING POSITIVE ELECTRODE MATERIAL, POSITIVE ELECTRODE PLATE, SECONDARY BATTERY, BATTERY MODULE, BATTERY PACK AND ELECTRICAL APPARATUS"", filed on Dec. 29, 2021, which is incorporated herein by reference in its entirety.

TECHNICAL FIELD

The present application relates to the technical field of secondary batteries, and in particular to a positive electrode active material for secondary batteries, a method for preparing a positive electrode material, a positive electrode plate comprising the positive electrode active material, a secondary battery, a battery module, a battery pack and an electrical apparatus.

BACKGROUND ART

In recent years, with the increasingly wide use of secondary batteries, secondary batteries are widely used in energy storage power systems such as water power, thermal power, wind power and solar power stations, as well as electric tools, electric bicycles, electric motorcycles, electric vehicles, military equipment, aerospace and other fields. Due to the great development of secondary batteries, higher requirements have also been put forward for their energy density, cycling performance and safety performance.

However, low-temperature power of lithium iron phosphate-based secondary batteries has not been effectively improved during charging and discharging at low temperatures.

SUMMARY OF THE INVENTION

The present application is made in view of the above subject, and its objective is to provide a positive electrode active material for secondary batteries, solving the problem of insufficient low-temperature power, especially insufficient long-pulse discharge power at low temperature and low state of charge (SOC).

In order to achieve the above objective, the present application provides a positive electrode active material for secondary batteries, a method for preparing a positive electrode material, a positive electrode plate comprising the positive electrode active material, a secondary battery, a battery module, a battery pack and an electrical apparatus.

A first aspect of the present application provides a positive electrode active material for secondary batteries, including lithium iron phosphate as a first active material and a compound of the general formula $Li_aM(XO_4)Y_b$ as a second active material, wherein M is selected from Fe, Mn, Co, Ni, Ti, V or a combination thereof; X is selected from one of P, S, Si, As, Mo or W; Y is selected from F; a is any value of 1 to 2; and b is any value of 0 to 1.

Secondary batteries using the positive electrode active material are allowed to be discharged continuously at low temperatures.

In any of embodiments, optionally, M is selected from Ti or Fe, X is selected from P or S, Y is F, a is 1 and b is 1.

In any of embodiments, optionally, the second active material has a plateau voltage of less than 3.22 V.

In any of embodiments, optionally, the second active material has a content of 2 wt % to 15 wt %, optionally 5 wt % to 10 wt %, based on the total weight of the first active material and the second active material.

In any of embodiments, optionally, the first active material is physically bonded to the second active material; optionally, the second active material is coated on a surface of the first active material.

In any of embodiments, optionally, the first active material is physically bonded to the second active material without solid phase sintering.

In any of embodiments, optionally, the second active material has a particle size Dv50 ranging from 10 nm to 5 μm, optionally from 15 nm to 500 nm, further optionally from 20 nm to 100 nm.

A second aspect of the present application further provides a method for preparing a positive electrode material, including the steps of:

(1) adding the positive electrode active material of the first aspect, a binder, a conductive agent and a dispersant into a solvent; and (2) coating a positive electrode slurry obtained in step (1) onto a positive electrode current collector, followed by drying, to obtain a positive electrode material for secondary batteries.

In any of embodiments, optionally, the positive electrode active material includes lithium iron phosphate as a first active material and a compound of the general formula $Li_aM(XO_4)\ Y_b$ as a second active material, wherein M is selected from Fe, Mn, Co, Ni, Ti, V or a combination thereof; X is selected from one of P, S, Si, As, Mo or W; Y is selected from F; a is any value of 1 to 2; and b is any value of 0 to 1.

In any of embodiments, optionally, the method does not include a step of solid phase sintering of the positive electrode slurry.

In any of embodiments, optionally, the second active material of the general formula $Li_aM(XO_4)Y_b$ is prepared by a ceramic preparation method or an ionothermal synthesis method.

A third aspect of the present application provides a positive electrode plate, including the positive electrode active material for secondary batteries of the first aspect of the present application or a positive electrode material prepared by the method of the second aspect.

A fourth aspect of the present application provides a secondary battery, including the positive electrode active material for secondary batteries of the first aspect of the present application, a positive electrode material prepared by the method of the second aspect, or the positive electrode plate of the third aspect of the present application.

A fifth aspect of the present application provides a battery module, including the secondary battery of the fourth aspect of the present application.

A sixth aspect of the present application provides a battery pack, including the secondary battery of the fourth aspect of the present application or the battery module of the fifth aspect of the present application.

A seventh aspect of the present application provides an electrical apparatus, including at least one of the secondary battery of the fourth aspect of the present application, the battery module of the fifth aspect of the present application, or the battery pack of the sixth aspect of the present application.

The positive electrode plate, secondary battery, battery module, battery pack or electrical apparatus of the present application includes the positive electrode active material of the first aspect of the present application and accordingly have at least the same advantages as the positive electrode material described in the first aspect of the present application.

Figure 1:
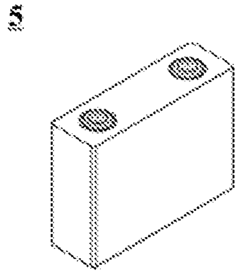
FIG. 1 is a schematic diagram of a secondary battery according to an embodiment of the present application.

DESCRIPTION OF REFERENCE NUMERALS 1 battery pack; 2 upper box body; 3 lower box body; 4 battery module; 5 secondary battery; 51 case; 52 electrode assembly; and 53 top cover assembly

DETAILED DESCRIPTION

Hereinafter, embodiments that specifically disclose a positive electrode active material for secondary batteries, a method for preparing a positive electrode material, a positive electrode plate comprising the positive electrode active material, a secondary battery, a battery module, a battery pack, and an electrical apparatus of the present application will be described in detail with reference to the drawings as appropriate. However, unnecessary detailed description will be omitted in some cases. For example, there are cases where detailed descriptions of well-known items and repeated descriptions of actually identical structures are omitted. This is to avoid unnecessarily prolonging the following description, for ease of understanding by those skilled in the art. In addition, the drawings and subsequent descriptions are provided for those skilled in the art to fully understand the present application, and are not intended to limit the subject matter recited in the claims.

A "range" disclosed in the present application is defined in terms of a lower limit and an upper limit, and a given range is defined by selecting a lower limit and an upper limit, which define the boundaries of the particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless otherwise stated, a value range of "a-b" is a short representation of any combination of real numbers between a and b, wherein both a and b are real numbers. For example, a value range of "0-5" means that all real numbers in the range of "0-5" are listed herein, and "0-5" is just a short representation of a combination of these values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

Unless otherwise specified, all steps of the present application may be performed sequentially or randomly, and preferably sequentially. For example, a method including steps (a) and (b) indicates that the method may include steps (a) and (b) performed in sequence, or may include steps (b) and (a) performed in sequence. For example, that the method may further include step (c) indicates that step (c) may be added to the method in any order. For example, the method may include steps (a), (b), and (c), or steps (a), (c), and (b), or steps (c), (a), and (b), or the like.

Unless otherwise specified, the terms "include" and "comprise" mentioned in the present application are inclusive or may be exclusive. For example, the "include" and "comprise" may indicate that it is possible to include or comprise other components not listed, and it is also possible to include or comprise only the listed components.

The terms "more" and "less" used in the present application include the number, for example, "more than one" means one or more, "more than one of A and B" means "A", "B" or "A and B".

Unless otherwise specified, the term "or" is inclusive in the present application. By way of example, the phrase "A or B" means "A, B, or both A and B". More specifically, the condition "A or B" is satisfied under any one of the following conditions: A is true (or present) and B is false (or absent); A is false (or absent) and B is true (or present); or both A and B are true (or present).

In the present application, Dv50 has the meaning known in the art. Dv50 refers to the corresponding particle size of material particles or powder when the cumulative volume percentage thereof reaches 50%, which can be tested by methods known in the art. For example, with reference to the standard GB/T 19077.1-2016, it is obtained by direct testing with a laser diffraction particle size distribution measuring instrument (e.g., a Malvern Mastersizer 3000 laser particle analyzer).

Unless otherwise specified, the contents and percentages in the context of this application are based on mass.

Electric vehicles using lithium iron phosphate batteries have insufficient range and power at low temperatures (due to lower limit voltage protection in actual operating conditions, it is unable to discharge more power, resulting in a reduction of the actual range). Lithium iron phosphate has insufficient power at low temperature and low SOC (state of charge), and especially has insufficient long-pulse discharge power at low temperature and low SOC. Solutions in the prior art include high conductivity electrolyte, thin coating, etc., but the actual improvement effect is very limited. The inventors of the present application have found that discharge power at low temperature and low SOC can be improved significantly by adding a small amount of a second type of material with a lower discharge voltage plateau than that of lithium iron phosphate to the lithium iron phosphate. Without being confined to any reason, it is believed that when a battery is discharged to a low SOC, because the discharge voltage plateau of the second type of material is lower than that of lithium iron phosphate, the second type of material itself is in a high SOC state and has a strong discharge capability, which can achieve quick intercalation of a large amount of lithium ions, enabling the battery to maintain continuous discharge at a certain voltage.

After extensive experiments, the inventors of the present application have found that when the positive electrode active material includes the following materials, it can significantly improve the discharge capability of the battery at low temperature and low SOC:

lithium iron phosphate as a first active material and a compound of the general formula $Li_aM(XO_4)Y_b$ as a second active material, wherein M is selected from Fe, Mn, Co, Ni, Ti, V, or a combination thereof, X is selected from one of P, S, Si, As, Mo, or W, Y is selected from F, a is any value of 1 to 2, and b is any value of 0 to 1.

[Positive Electrode Material]

A first aspect of the present application provides a positive electrode active material, including lithium iron phosphate as a first active material and a compound of the general formula $Li_aM(XO_4)$ $Y_b$ as a second active material, wherein M is selected from Fe, Mn, Co, Ni, Ti, V or a combination thereof; X is selected from one of P, S, Si, As, Mo or W; Y is selected from F; a is any value of 1 to 2; and b is any value of 0 to 1.

In some embodiments, optionally, M is selected from Ti or Fe, X is selected from P or S, Y is F, a is 1 and b is 1. The use of metal elements such as Fe and Ti reduces operating cost.

In some embodiments, optionally, the second active material has a plateau voltage of less than 3.22 V. The plateau voltage is an average value of voltage corresponding to an interval of smooth voltage change during charging and discharging of a battery. The plateau voltage is tested as follows: the active materials are assembled into a conventional button cell which is then subjected to a charge/discharge gram capacity test with a voltage range of 0.1-3.85V and is charged/discharged at 0.1 C.

Preferably, the second active material has an electronic conductivity of $\geq 1*10^{-9}$ S $cm^{-1}$ (room temperature) and an ionic conductivity of $>2*10^{-9}$ S $cm^{-1}$ (147° C.). The second active material has the conductivity superior to that of a lithium iron phosphate material.

In any of embodiments, optionally, the second active material has a content of 2 wt % to 15 wt %, preferably 5 wt % to 10 wt %, based on the total weight of the first active material and the second active material. When the content of the second active material is within the above range, the lower the internal resistance, the higher the low-temperature power of the battery using the positive electrode material of the present application.

In some embodiments, optionally, the first active material is physically bonded to the second active material; optionally, the second active material is coated on a surface of the first active material. As used herein, "physically bonded" means that the first active material is simply physically mixed with the second active material or the second active material is coated on a surface of the first active material. Low-temperature power of the battery using the positive electrode material of the present application is further improved when the second active material is coated on a surface of the first active material.

In some embodiments, optionally, the first active material is physically bonded to the second active material without solid phase sintering. If the solid phase sintering is performed on the positive electrode active material, the preparation cost and process complexity of the battery will be increased in practice. Therefore, the present invention solves the problem of low low-temperature power only by a simple physical bonding of the positive electrode active material.

In some embodiments, optionally, the second active material has a particle size Dv50 ranging from 20 nm to 5 μm, preferably from 20 nm to 1 μm, further preferably from 20 nm to 100 nm. The inventors of the present application have found that when the particle size of the second active material tends to be nanosized from the micron level, the conductivity and lithium diffusion rate of the positive electrode material can be improved, thereby further improving power performance of the battery.

The positive electrode material of the present application optionally includes a conductive agent in addition to the positive electrode active material. However, the type of the conductive agent is not particularly limited, and those skilled in the art can make a selection according to actual needs. By way of example, the conductive agent for the positive electrode film layer may be selected from one or more of superconducting carbon, acetylene black, carbon black, Ketjen black, carbon dot, carbon nanotube, graphene, and carbon nanofiber.

The positive electrode material further optionally includes a binder. The binder may be selected from at least one of polyvinylidene fluoride (PVdF), styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the positive electrode material can be prepared by:

(1) adding the positive electrode active material of the first aspect, a binder, a conductive agent and a dispersant into a solvent; and (2) coating a positive electrode slurry obtained in step (1) onto a positive electrode current collector, followed by drying, to obtain a composite positive electrode material for secondary batteries.

In some embodiments, optionally, the positive electrode active material includes lithium iron phosphate as a first active material and a compound of the general formula $Li_aM(XO_4)Y_b$ as a second active material, wherein M is selected from Fe, Mn, Co, Ni, Ti, V or a combination thereof; X is selected from one of P, S, Si, As, Mo or W; Y is selected from F; a is any of 1 to 2 Value; b is any value from 0 to 1.

In some embodiments, optionally, the method does not include a step of solid phase sintering of the positive electrode slurry.

In some embodiments, optionally, the second active material of the general formula $Li_aM(XO_4)Y_b$ is prepared by a ceramic preparation method or an ionothermal synthesis method.

A $Li_aM(XO_4)Y_b$ material with a micron-level particle size can be prepared by the ceramic preparation method. For example, the preparation steps are as follows: ball milling $TiF_3$ and $Li_3PO_4$ precursors with a stoichiometric ratio in a ball mill for a period of time, then placing powder in a stainless steel or platinum container, and sintering at a high temperature for a period of time under an inert gas; cleaning the sintered powder, and then drying it in an oven to obtain the micron-level $LiTiPO_4F$ material.

A $Li_aM(XO_4)$ $Y_b$ material with a nanoscale particle size can be prepared by the ionothermal synthesis method. For example, the preparation steps are as follows: adding 1,2-dimethyl-3-hydroxypropylimidazolium bis(trifluoromethylsulfonyl)imide into $TiF_3$ and $Li_3PO_4$ with an equimolar ratio, stirring for a period of time, then heating at a high temperature for a period of time, and finally cooling to room temperature; washing powder, and then drying it in an oven to obtain the nanoscale $LiTiPO_4F$ material. The ionothermal synthesis method described is documented in patent U.S. Pat. No. 9,590,245B2, the disclosure of which is incorporated herein by reference in its entirety.

[Positive Electrode Plate]

The positive electrode plate includes a positive electrode current collector and a positive electrode film layer arranged on at least one surface of the positive electrode current collector, and the positive electrode film layer includes the positive electrode material of the first aspect of the present application.

As an example, the positive electrode current collector has two opposite surfaces in its own thickness direction, and the positive electrode film layer is arranged on either or both of the opposite surfaces of the positive electrode current collector.

In the secondary battery of the present application, the positive electrode current collector may be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, the positive electrode plate can be prepared by dispersing the components for preparing the positive electrode plate, for example, the active materials, the conductive agent, the binder and any other components in a solvent (e.g., N-methyl pyrrolidone) to form a positive electrode slurry; and coating the positive electrode slurry on the positive electrode current collector, followed by oven drying, cold pressing and other procedures, to obtain the positive electrode plate.

[Negative Electrode Plate]

The negative electrode plate includes a negative electrode current collector and a negative electrode film layer arranged on at least one surface of the negative electrode current collector. The negative electrode film layer includes a negative electrode active material.

As an example, the negative electrode current collector has two opposite surfaces in its own thickness direction, and the negative electrode film layer is disposed on either one or both of the two opposite surfaces of the negative electrode current collector.

In the secondary battery of the present application, a metal foil or a composite current collector can be employed as the negative electrode current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In the secondary battery of the present application, the negative electrode film layer generally includes a negative electrode active material and an optional binder, an optional conductive agent and other optional auxiliaries, and is usually formed by coating a negative electrode slurry and then drying. The negative electrode slurry is generally formed by dispersing the negative electrode active material as well as the optional conductive agent and the binder, etc. in a solvent and uniformly stirring. The solvent may be N-methyl pyrrolidone (NMP) or deionized water.

As an example, the conductive agent may be one or more selected from superconducting carbon, acetylene black, carbon black, Ketjen black, carbon dot, carbon nanotube, graphene, and carbon nanofiber.

By way of example, the binder may be selected from one or more of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

Other optional adjuvants are for example a thickener (such as sodium carboxymethylcellulose (CMC-Na)) and the like.

In the secondary battery of the present application, in addition to the negative electrode active material, the negative electrode film layer further optionally includes other commonly used negative electrode active materials. For example, as other commonly used negative electrode active materials, artificial graphite, natural graphite, soft carbon, hard carbon, silicon-based materials, tin-based materials and lithium titanate, etc. can be listed. The silicon-based material may be selected from one or more of elemental silicon, silicon-oxygen compound, silicon-carbon composite, silicon-nitrogen composite, and silicon alloy. The tin-based material may be selected from one or more of elemental tin, tin-oxygen compound, and tin alloy.

In some embodiments, the negative electrode plate can be prepared by dispersing the components for preparing the negative electrode plate, for example, the negative electrode active material, the conductive agent, the binder and any other components in the solvent (for example, deionized water) to form a negative electrode slurry; and coating the negative electrode slurry on the negative electrode current collector, followed by drying, cold pressing and other procedures, to obtain the negative electrode plate.

[Electrolyte]

The electrolyte serves to conduct ions between the positive electrode plate and the negative electrode plate. The type of the electrolyte is not particularly limited in the present application, and can be selected according to requirements. For example, the electrolyte may be selected from at least one of solid electrolyte and liquid electrolyte (i.e., electrolyte solution).

In some embodiments, an electrolyte solution is used as the electrolyte. The electrolyte solution includes an electrolyte salt and a solvent.

In some embodiments, the electrolyte salt may be one or more selected from $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethanesulfonyl)imide), LiTFS (lithium trifluoromethanesulfonate), LiDFOB (lithium difluoro(oxalato)borate), LiBOB (lithium bis(oxalate)borate), $LiPO_2F_2$ (lithium difluorophosphate), LiDFOP (lithium difluoro bis(oxalato) phosphate) and LiTFOP (lithium tetrafluoro(oxalato)phosphate).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and diethyl sulfone (ESE).

In some embodiments, the electrolyte solution further optionally includes an additive. For example, the additives may include a negative electrode film-forming additive, or may include a positive electrode film-forming additive, or may further include an additive that can improve some performance of the battery, such as an additive that improves overcharge performance of the battery, an additive that improves high temperature performance of the battery, and an additive that improves low temperature performance of the battery.

[Separator]

The secondary battery using an electrolyte solution and some secondary batteries using a solid electrolyte further include a separator. The separator is disposed between the positive electrode plate and the negative electrode plate and functions to separate. The type of the separator is not particularly limited in the present application, and any well-known separator with a porous structure having good chemical stability and mechanical stability may be selected. In some embodiments, the material of the separator may be one or more selected from glass fiber, non-woven cloth, polyethylene, polypropylene, and polyvinylidene fluoride. The separator may be a single-layer film or a multi-layer composite film, which is not particularly limited. When the separator is a multi-layer composite film, the material of each layer may be the same or different, which is not particularly limited.

In some embodiments, the positive electrode plate, the negative electrode plate, and the separator can be made into an electrode assembly by a winding process or a stacking process.

In some embodiments, the secondary battery may include an outer package. The outer package can be used to encapsulate the above-mentioned electrode assembly and electrolyte.

In some embodiments, the outer package of the secondary battery may be a hard shell, e.g., a hard plastic shell, an aluminum shell, a steel shell, etc. The outer package of the secondary battery may also be a soft package, such as a pouch. The material of the soft package may be plastic, and examples of the plastic include polypropylene (PP), polybutylene terephthalate (PBT), polybutylene succinate (PBS), and the like.

Moreover, the secondary battery, battery module, battery pack and electrical apparatus of the present application will be described hereafter with appropriate reference to the drawings.

The present application has no particular limitation on the shape of the secondary battery, which can be cylindrical, square or any other shape. For example, FIG. 1 shows a secondary battery 5 with a square structure as an example.

Figure 2:
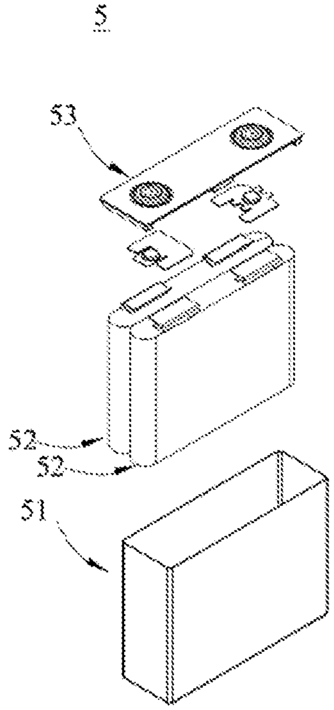
FIG. 2 is an exploded view of the secondary battery according to an embodiment of the present application shown in FIG. 1.

In some embodiments, referring to FIG. 2, the outer package may include a case 51 and a cover plate 53. Here, the case 51 may include a bottom plate and a side plate connected to the bottom plate, with the bottom plate and the side plate enclosing to form an accommodating cavity. The case 51 has an opening that communicates with the accommodating cavity, and the cover plate 53 is capable of covering the opening to close the accommodating cavity. The positive electrode plate, the negative electrode plate, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 included in the secondary battery 5 may be one or more, which may be selected by those skilled in the art according to specific actual requirements.

In some embodiments, the secondary batteries may be assembled into a battery module, the number of the secondary batteries included in the battery module may be one or more, and the specific number can be selected by those skilled in the art according to the application and capacity of the battery module.

Figure 3:
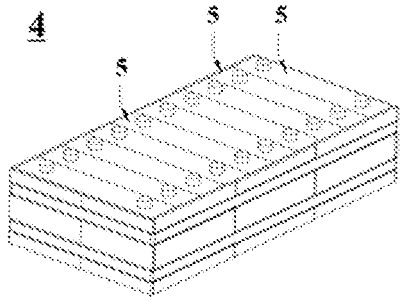
FIG. 3 is a schematic diagram of a battery module according to an embodiment of the present application.

FIG. 3 shows a battery module 4 as an example. Referring to FIG. 3, in the battery module 4, a plurality of secondary batteries 5 may be sequentially arranged in a length direction of the battery module 4. Of course, any other arrangements are also possible. The plurality of secondary batteries 5 may further be fixed by fasteners.

Optionally, the battery module 4 may further include a shell having an accommodating space, in which the plurality of secondary batteries 5 are accommodated.

In some embodiments, the battery module may further be assembled into a battery pack, the number of battery modules included in the battery pack may be one or more, and the specific number can be selected by those skilled in the art according to the application and capacity of the battery pack.

Figure 4:
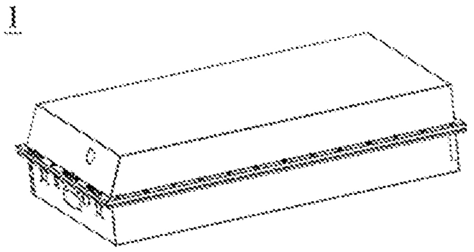
FIG. 4 is a schematic diagram of a battery pack according to an embodiment of the present application.
Figure 5:
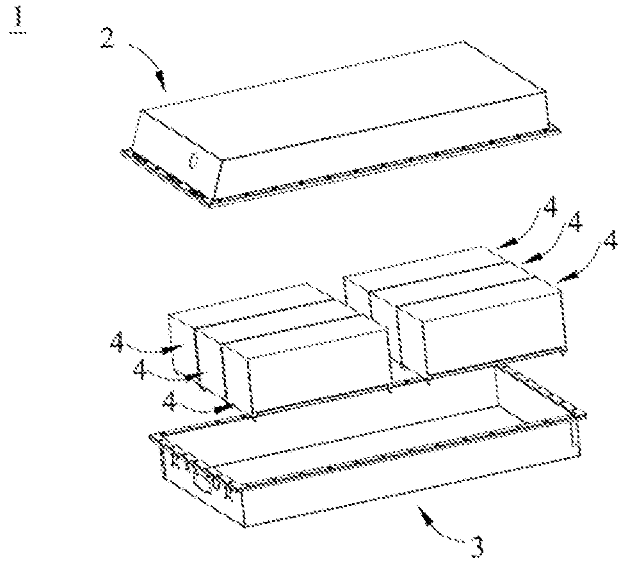
FIG. 5 is an exploded view of the battery pack according to an embodiment of the present application shown in FIG. 4.

FIGS. 4 and 5 show a battery pack 1 as an example. Referring to FIGS. 4 and 5, the battery pack 1 may include a battery box and a plurality of battery modules 4 provided in the battery box. The battery box includes an upper box body 2 and a lower box body 3, the upper box body 2 can cover the lower box body 3 to form a closed space for accommodating the battery modules 4. The plurality of battery modules 4 may be arranged in the battery box in any manner.

In addition, the present application further provides an electrical apparatus, and the electrical apparatus includes at least one of the secondary battery, the battery module, or the battery pack provided in the present application. The secondary battery, battery module, or battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, an energy storage system, etc.

For the electrical apparatus, the secondary battery, the battery module, or the battery pack may be selected according to its use requirements.

Figure 6:
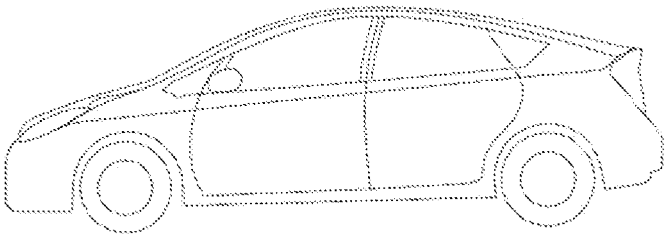
FIG. 6 is a schematic diagram of an electrical apparatus according to an embodiment of the present application in which the secondary battery is used as a power source.

FIG. 6 shows an electrical apparatus as an example. The electrical apparatus is an all-electric vehicle, a hybrid electric vehicle, a plug-in hybrid electric vehicle, or the like. In order to meet the requirements of the electrical apparatus for high power and high energy density of secondary batteries, a battery pack or a battery module may be used.

As another example, the apparatus may be a mobile phone, a tablet, a laptop, etc. The apparatus is generally required to be light and thin, and may use a secondary battery as a power source.

EXAMPLES

Examples of the present application will be described hereinafter. The examples described below are illustrative and only used for explaining the present application, and cannot be construed as limitations on the present application. Where specific techniques or conditions are not specified in the examples, the techniques or conditions described in the literatures of the art or the product specifications are followed. Where manufacturers are not specified, the reagents or instruments used are conventional products and are commercially available.

The raw material sources involved in the examples of the present application are as follows:

Preparation of $LiTiPO_4F$ Material:

1) Ceramic preparation method (to prepare a material with micron-level particle size): $TiF_3$ (CAS: 13470-08-1, purchased from Aladdin) and $Li_3PO_4$ (CAS: 10377-52-3, purchased from Sinopharm Chemical Reagent) precursors with a stoichiometric ratio were ball-milled in a ball mill for about 10-30 min (the reaction formula is as $TiF_3$+$Li_3PO_4$→$LiTiPO_4F$+2LiF). The powder obtained by ball-milling was placed in a stainless steel or platinum container, and sintered at 700° C. for 24 h under inert gas of Ar. The sintered powder was quickly rinsed with cool water to wash off the LiF, then cleaned with acetone, and dried in an oven at 60° C. A $LiTiPO_4F$ material with a Dv50 particle size of 1-5 μm were finally obtained.

2) Ionothermal synthesis method (to prepare a material with nanoscale particle size): 5-10 ml of 1,2-dimethyl-3-hydroxypropylimidazolium bis(trifluoromethylsulfonyl)imide (CAS: 169051-76-7, purchased from Aladdin) was added into $TiF_3$ and $Li_3PO_4$ with an equimolar ratio, followed by stirring for 10-30 min, heating for 24-48 h at 200-400° C., and cooling to room temperature. The obtained powder was washed with acetone and cool water respectively to remove the remaining ionic liquid and LiF, and then dried in an oven at 60° C. A $LiTiPO_4F$ material with a particle size Dv50 of 20-100 nm were finally obtained.

Preparation of $LifePO_4F$ material: In addition to that the precursors $FeF_3$ (CAS: 7783-50-8, purchased from Sinopharm Chemical Reagent) and $Li_3PO_4$ (CAS: 10377-52-3, purchased from Sinopharm Chemical Reagent) were in a stoichiometric ratio of the reaction formula ($FeF_3$+$Li_3PO_4$→$LiFePO_4F$+2LiF), a $LiFePO_4F$ material with a Dv50 of 1-5 μm were obtained by the same method as the ceramic preparation method above.

Preparation of $LiFeSO_4F$ material: $FeSO_4\cdot 7H_2O$ (CAS: 7782-63-0, purchased from Sinopharm Chemical Reagent) and LiF (CAS: 70100-89-9, purchased from Aladdin) with a stoichiometric ratio were ball-milled for 8-24 h in a high-energy ball mill, and then sintered at a high temperature of 350-400° C. for 50-70 h. A $LiFeSO_4F$ material with a particle size Dv50 of 500 nm-2 μm was finally produced.

Preparation of $Li_2FeSiO_4$ material: $Li_2SiO_3$ (CAS: 10102-24-6, purchased from Sinopharm Chemical Reagent) and $FeC_2O_4\cdot 2H_2O$ (CAS: 6047-25-2, purchased from Sinopharm Chemical Reagent) with a stoichiometric ratio were mixed fully in acetone. After volatilization of acetone, a mixture was heated at 700-800° C. for 24-48 h, while a mixed gas stream of $CO/CO_2$ was introduced for preventing oxidation of $Fe^{2+}$. A $Li_2FeSiO_4$ material with a particle size Dv50 of 100-300 nm was finally obtained.

The $LiFePO_4$ material is purchased from Sinopharm Chemical Reagent.

The $LiPF_6$ material refers to lithium hexafluorophosphate, CAS: 21324-40-3, purchased from Sinopharm Chemical Reagent.

Example 1

[Preparation of Positive Electrode Plate]

A first active material $LiFePO_4$, a second active material $LiTiPO_4F$ (obtained by the ceramic preparation method), a binder polyvinylidene fluoride (PVDF), a conductive carbon black and a dispersant (sodium dodecyl sulfate) were dissolved in a solvent N-methyl pyrrolidone (NMP) according to a mass ratio of 96.228:0.972:1.8:0.7:0.3, and stirred into a homogeneous and transparent system under the action of a vacuum stirrer to obtain a positive electrode slurry. The positive electrode slurry was uniformly coated on an aluminum foil of a positive electrode current collector at a coating amount of 0.0987 mg/mm$^2$, dried at room temperature and then transferred to an oven for drying, followed by cold pressing and slitting, to obtain a positive electrode plate.

[Preparation of Negative Electrode Plate]

A negative electrode active material artificial graphite, a conductive agent acetylene black, a binder styrene butadiene rubber (SBR), and a thickener sodium carboxymethyl cellulose (CMC-Na) were dissolved in a solvent deionized water according to a mass ratio of 95:2:2:1, and mixed uniformly with the solvent deionized water to prepare a negative electrode slurry. Then, the negative electrode slurry was uniformly coated on a copper foil of a negative electrode current collector at a coating amount of 0.219 mg/mm$^2$, followed by cold pressing and slitting, to obtain a negative electrode plate.

[Preparation of Electrolyte Solution]

Ethylene carbonate (EC), ethyl methyl carbonate (EMC) and diethyl carbonate (DEC) were mixed uniformly in a volume ratio of 1:1:1 to obtain an organic solvent. 1 mol/L $LiPF_6$ was dissolved in the organic solvent, and then 2% vinylene carbonate (VC) was added and mixed uniformly to obtain an electrolyte solution.

[Preparation of Secondary Battery]

A polypropylene film with a thickness of 12 μm was used as a separator. The positive electrode plate, the separator and the negative electrode plate were stacked sequentially, so that the separator was positioned between the positive electrode plate and the negative electrode plate to separate them, an electrode assembly was placed into a battery case and dried, and then injected with the electrolyte solution, followed by processes such as formation and standing, to obtain a secondary battery.

Condition parameters of other embodiments are shown in Table 1, and [Preparation of positive electrode plate], [Preparation of negative electrode plate], [preparation of electrolyte solution] and [preparation of battery] of these embodiments are the same as processes in Example 1.

Comparative Example 1 is the same as Example 1 in terms of the process, with the difference that the positive electrode material is prepared without adding of the second active material.

[Low-Temperature Power Test]

SOC of the secondary battery prepared above was adjusted to the specified 20% SOC in a high-low temperature chamber at room temperature, initial voltage value V0 was recorded, temperature of the temperature chamber was adjusted to −25° C., then standing was performed for 2 h. A charger-discharger was set with a constant current of 0.7 C (C=battery rated capacity of 125 Ah), lower limit voltage was set to 1.5V, and continuous discharge time was 180 s. When the discharge time satisfies 180 s, voltage at a discharge terminal was recorded as Vt. Internal resistance=(V0−Vt)/0.7 C (mohm), the smaller the internal resistance, indicating the greater the power of the secondary battery.

TABLE 1

Condition parameters of examples and comparative example

| No. | Second active material | Plateau voltage of second active material (V) | Content of second active material (wt %) | Battery internal resistance (−25° C., 20% soc, 180 s) 0.7 C, lower limit voltage: 1.5 V | Improvement proportion (−improved; +deteriorated) |
|---|---|---|---|---|---|
| Example 1 | $LiTiPO_4F$ | 2.8 | 1% | 13.9 | −5% |
| Example 2 | $LiTiPO_4F$ | 2.8 | 2% | 12.7 | −13% |
| Example 3 | $LiTiPO_4F$ | 2.8 | 5% | 9.9 | −32% |
| Example 4 | $LiTiPO_4F$ | 2.8 | 10% | 7.9 | −46% |
| Example 5 | $LiTiPO_4F$ | 2.8 | 15% | 7.6 | −48% |
| Example 6 | $LiFePO_4F$ | 3 | 2% | 13.1 | −10% |
| Example 7 | $LiFeSO_4F$ | 3.6 | 2% | 13.7 | −6% |
| Example 8 | $Li_2FeSiO_4$ | 2.76 | 2% | 12.4 | −15% |
| Comparative Example 1 | — | — | — | 14.6 | 0% |

Comprehensively analyzing the results in Table 1, it can be seen that the plateau voltage of the second active material affects improvement of the low-temperature power, and a material with a large difference in plateau voltage with that of lithium iron phosphate (plateau voltage<3.22 V) is preferred, for example, $LiTiPO_4F$.

Analyzing Examples 1-5 in Table 1, it can be seen that when a bending ratio of the second active material is 2-15 wt %, the low-temperature power of the battery is improved; when the blending ratio of the second active material is 5-10 wt %, the low-temperature power of the battery is further improved. When the blending ratio of the second active material is greater than 15 wt %, the improvement of the low-temperature power is limited compared to the increased material cost.

[Effect of Particle Size and Mixing Method of Second Active Material on Battery Performance]

Example 10 of the present application uses the same preparation method as in Example 3, with the difference that $LiTiPO_4F$ was coated on a surface of $LiFePO_4$ during preparation of the positive electrode material.

Examples 9 and 11 of the present application use the same preparation method as in Examples 3 and 10, with the difference that the $LiTiPO_4F$ material was prepared by the ionothermal synthesis method, with a particle size Dv50 of 20-100 nm.

TABLE 2

Effect of particle size and mixing method of second active material on battery performance

| No. | Second active material | Content of second active material (wt %) | Mixing method | Particle size Dv50 | Battery internal resistance (−25° C., 20% soc, 180 s) 0.7 C, lower limit voltage: 1.5 V | Improvement proportion (− improved; + deteriorated) |
|---|---|---|---|---|---|---|
| Example 3 | $LiTiPO_4F$ | 5% | Physical mixing | 1-5 μm | 9.9 | −32% |
| Example 9 | $LiTiPO_4F$ | 5% | Physical mixing | 20-100 nm | 8.3 | −43% |
| Example 10 | $LiTiPO_4F$ | 5% | Coated on surface of first type of material | 1-5 μm | 8.0 | −45% |
| Example 11 | $LiTiPO_4F$ | 5% | Coated on surface of first type of material | 20-100 nm | 6.1 | −58% |
| Comparative Example 1 | — | — | — | — | 14.6 | 0% |

According to Table 2, it can be seen that when the particle size of the second active material tends to be nanosized from the micron level, the conductivity and lithium diffusion rate of the positive electrode material can be improved, thereby further improving power performance of the battery. In addition, coating the second active material on a surface of the first active material also further improves the low-temperature power of the battery compared to the simple physical mixing of the first active material and the second active material.

It should be noted that the present application is not limited to the above embodiments. The above-described embodiments are merely illustrative, and embodiments having substantively the same composition as the technical idea and exerting the same effects within the scope of the technical solution of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

What is claimed is:

1. A positive electrode active material, comprising a first active material and a second active material, the second active material is coated on a surface of the first active material, the first active material comprises lithium iron phosphate, the second active material comprises a compound of the general formula $Li_aM(XO_4)Y_b$, wherein M is selected from Fe, Mn, Co, Ni, Ti, V or a combination thereof; X is selected from one of P, S, Si, As, Mo or W; Y is selected from F; a is any value of 1 to 2; and b is any value of 0 to 1, wherein the compound comprises $LiTiPO_4F$, the second active material has a plateau voltage of less than 3.22 V, wherein the second active material has a content of 2 wt % to 15 wt %, based on a total weight of the first active material and the second active material.

2. The positive electrode active material according to claim 1, wherein Mis selected from Ti or Fe, X is selected from P or S, Y is F, a is 1, and b is 1.

3. The positive electrode active material according to claim 1, wherein the second active material has a particle size Dv50 ranging from 20 nm to 5 μm.

4. A positive electrode plate, comprising a positive electrode active material, wherein the positive electrode active material comprises a first active material and a second active material, the second active material is coated on a surface of the first active material, the first active material comprises lithium iron phosphate, the second active material comprises a compound of the general formula $Li_aM(XO_4)Y_b$, M is selected from Fe, Mn, Co, Ni, Ti, V or a combination thereof; X is selected from one of P, S, Si, As, Mo or W; Y is F; a is any value of 1 to 2; and b is any value of 0 to 1, wherein the compound comprises $LiTiPO_4F$, the second active material has a plateau voltage of less than 3.22 V, the second active material has a content of 2 wt % to 15 wt %, based on a total weight of the first active material and the second active material.

5. The positive electrode plate according to claim 4, wherein the second active material has a particle size Dv50 ranging from 20 nm to 5 μm.

6. The positive electrode plate according to claim 5, wherein the particle size Dv50 of the second active material is 20 nm to 100 nm.

7. A secondary battery, comprising a positive electrode plate, wherein the positive electrode plate comprises a positive electrode active material, the positive electrode active material comprises a first active material and a second active material, the second active material is coated on a surface of the first active material, the first active material comprises lithium iron phosphate, the second active material comprises a compound of the general formula $Li_aM(XO_4)Y_b$, M is selected from Fe, Mn, Co, Ni, Ti, V or a combination thereof; X is selected from one of P, S, Si, As, Mo or W; Y is F; a is any value of 1 to 2; and b is any value of 0 to 1, wherein the compound comprises $LiTiPO_4F$, the second active material has a plateau voltage of less than 3.22 V, wherein the second active material has a content of 2 wt % to 15 wt %, based on a total weight of the first active material and the second active material.

8. A battery module, comprising the secondary battery according to claim 7.

9. A battery pack, comprising the secondary battery according to claim 7.

10. An electrical apparatus, comprising the secondary battery according to claim 7, wherein the secondary battery is used as a power source for the electrical apparatus or an energy storage unit for the electrical apparatus.

11. The secondary battery according to claim 7, wherein the second active material has a particle size Dv50 ranging from 20 nm to 5 μm.

* * * * *